June 9, 1925.  A. WALLACE  1,540,914
TRUCK
Filed Jan. 3, 1925
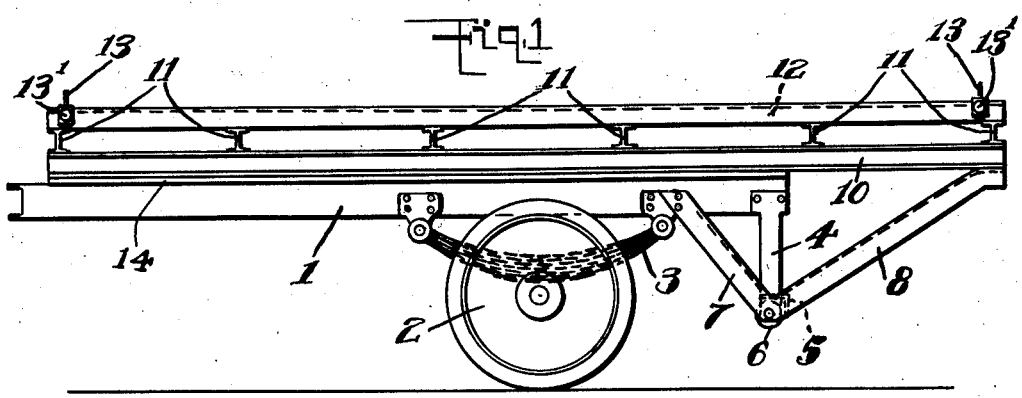
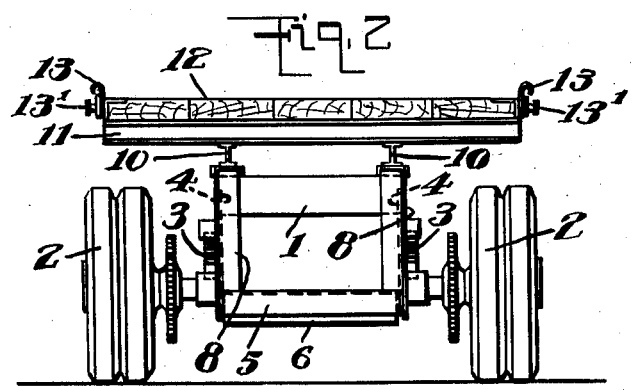
Inventor
Alexander Wallace
By Ellis Spackman
Attorney Patented June 9, 1925.

1,540,914

UNITED STATES PATENT OFFICE.

ALEXANDER WALLACE, OF SHAWSHEEN VILLAGE, MASSACHUSETTS.

TRUCK.

Application filed January 3, 1925. Serial No. 303.

*To all whom it may concern:*

Be it known that I, ALEXANDER WALLACE, a subject of George V, King of England, residing at Shawsheen Village, county of Essex, Commonwealth of Massachusetts, have invented certain new and useful Improvements in Trucks, of which the following is a specification.

This invention relates to vehicle bodies and particularly to the construction of such a body upon a truck chassis. For many uses it is desirable that the truck body be constructed with special reference to the load and this has been effected in various manners to meet the specific requirements of the user. One of the factors desired common to a large proportion of these problems is that of getting increased length which is usually coupled with a desire for increase in breadth. This apparently simple problem is in actual practice rendered difficult by the requirements of performance of the truck as a loaded vehicle on the ordinary roads or highways over which it must be operated. The problem therefore is not merely one of mere lengthening out or adding to a previous body but of organizing with any given chassis a structure which will afford a maximum carrying capacity of the vehicle in actual operation.

While my invention is capable of being applied to the chassis of trucks of various make, and is so to be understood, I shall present for consideration herein a single specific construction which illustrates the principles of the invention and is in itself a proven embodiment of great merit. Throughout the specification and drawings like reference characters are employed to indicate like parts, and in the drawings:

Fig. 1 is a side view of the rear end of a truck in accordance with my invention, and Fig. 2 is a rear elevation of such an end portion.

I have indicated at 1 the usual longitudinal frame of a truck mounted on rear wheels 2 and supported by the springs 3. Such frames usually extend only a short distance beyond the rear wheels and are intended only for a body of substantially the length of the frame. The carrying capacity and distribution of the load are figured with general reference to such a body and any departure therefrom must be made with due consideration of the engineering factors developed in the chassis.

In accordance with my invention I mount on the truck frames a pair of I-beams 10 of such length as to give an overhang or extension to the rear for a predetermined distance. This distance should be figured in each case with reference to the width of the load carrying platform so that there will be a safe margin of counterpoise in advance of the rear wheels with reference to the load to the rear of these wheels.

In the construction shown, I have been able to carry my longitudinal members four feet to the rear of the chassis frame which represents a gain of four feet of longitudinal platform. In the form shown, the platform is eight feet wide. The specific load figured on in this case is wool, such as is usually shipped in bags, the weight of which is about two hundred pounds. The normal load for the usual truck platform would be about sixty-five bags which is not a full draft load for a truck of this type. For this reason, it has been the practice to use a trailer with the truck, but the difficulty of towing a trailer in traffic and the general prejudice against truck trailers is such that their use is not satisfactory.

The extension above described will give an additional capacity of from six to eight bags of wool. This obviously constitutes a heavy burden on any structure but my invention provides a simple and inexpensive means of dealing with this problem.

I hang from each rear end of the truck frame vertical struts 4 which are braced between their ends by a cross rod 5 on which is mounted a roller 6. The lower ends of the struts 4 are trussed by members 7 and 8. The member 7 preferably carries forward and is anchored to the frame preferably adjacent the rear end of the springs 3. The member 8 extends back and is anchored to the longitudinal member 10 on each side just short of the end thereof.

This gives to the rear portion back of the rear wheels an underslung truss construction which is so disposed as to give a maximum support at this portion of the platform without interference with or from the movements of the truck body in advance of the rear axle and without interfering in any way with the proper functioning of the springs.

On the longitudinal pieces 10 I mount at suitable intervals cross beams 11 on which is laid the platform 12 of any suitable material or construction. The cross pieces 11 are clamped to the longitudinal piece 10 and the longitudinal piece 10 is preferably bolted to the truck frame with an interposed strip of wood 14 which acts as a cushion throughout the length of the frame. At the sides of the frame I provide a fastening hook 13 having a stud 13' about which the stay loops may be turned to draw up on in tightening the load and to give a bite in fastening the same.

In building up a load upon such a body it will be found that the platform constitutes what is practically a cantilever, the load in advance of the axle being sufficient through the underhung trusses to carry the extra load at the rear with a wide margin of safety. The cantilevers furthermore through their intervening roller constitute a potential support in case of sudden inclines in the road or of other obstructions and also in case of careless unloading or accidental dislodgment of the load on the forward end of the truck prior to discharge of the load on the rear end.

Various modifications may be made in the details of the structure and in the proportioning and arrangement of the parts, all without departing from the spirit of my invention if within the limits of the appended claims.

What I therefore claim and desire to secure by Letters Patent:

1. In combination with a chassis frame including its longitudinal side members supported on the rear axle, an extension member overlying each of said side members and extending from substantially in advance of the axle to beyond the ends of said side members, a depending strut attached at one end to the frame members adjacent the ends thereof, forward truss members connecting the lower strut ends and the side members, and rear truss member connecting said ends and the extension members adjacent their ends.

2. In combination with a chassis frame including its longitudinal side members supported on the rear axle, an extension member overlying each of said side members and extending from substantially in advance of the axle to beyond the ends of said side members, a depending strut attached at one end to the frame members adjacent the ends thereof, forward truss members connecting the lower strut ends and the side members, and rear truss member connecting said ends and the extension members adjacent their ends, and a roller disposed between the strut ends.

3. In a truck chassis including longitudinal side members and a rear axle supporting the same, an extension member overlying each of said side members and extending beyond the ends of said side members, a depending truss adjacent the ends of the side members and connected to the extension members adjacent their ends, and a roller carried by the truss members and disposed at the lower part thereof.

4. In combination with a chassis frame including its longitudinal side members supported on the rear axle, an extension member overlying each of said side members and extending from substantially in advance of the axle to beyond the ends of said side members, a depending strut attached at one end of the frame members adjacent the ends thereof, forward truss members connecting the lower strut ends and the side members, and rear truss member connecting said ends and the extension members adjacent their ends.

5. In combination with a chassis frame including its longitudinal side members supported on the rear axle, an extension member overlying each of said side members and extending from substantially in advance of the axle to beyond the ends of said side members, cross beams carried by said extension members, a flooring on said beams, and a truss from one end of the frame members adjacent to the ends thereof and connected to the extension members adjacent their ends.

6. In combination with a chassis frame including its longitudinal side members supported on the rear axle, an extension member overlying each of said side members and extending from substantially in advance of the axle to beyond the ends of said side members, cross beams carried by said extension members, a flooring on said beam, a depending strut attached at one end to the frame members adjacent the ends thereof, forward truss members connecting the lower strut ends and the side members, and rear truss members connecting said ends and the extension members adjacent their ends, and a roller disposed between the strut ends.

In testimony whereof I affix my signature in presence of two witnesses.

ALEXANDER WALLACE.

Witnesses:
ANDREW M. NIXON,
JOSEPH L. BURNS.